United States Patent [19]
Ries

[11] 3,894,069
[45] July 8, 1975

[54] PROCESS FOR PREPARING DITHIODICARBONYL METAL COMPLEXES

[75] Inventor: Donald G. Ries, Brookhaven, Miss.

[73] Assignee: Nalco Chemical Company, Oak Brook, Ill.

[22] Filed: Aug. 3, 1973

[21] Appl. No.: 385,418

[52] U.S. Cl. .................. 260/439 R; 260/45.75 R; 260/45.75 N; 252/400 R; 260/406
[51] Int. Cl. ... C07f 15/02; C07f 15/04; C07f 15/06
[58] Field of Search .................... 260/429 R, 439 R

[56] References Cited
UNITED STATES PATENTS
3,588,216  6/1971  Bloom .................................. 350/1
FOREIGN PATENTS OR APPLICATIONS
1,211,626  3/1966  Germany Primary Examiner—Arthur P. Demers
Attorney, Agent, or Firm—Johnston, Keil, Thompson & Shurtleff

[57] ABSTRACT

Dithiodicarbonyl metal complexes are prepared in increased yields by a two-step process in which an acyloin is reacted with a phosphorus sulfide in the presence of ammonium ion in a solvent in the first step and the reaction solution preferably after filtration to remove solid residues is reacted in a second step with an aqueous solution of a water soluble ionizable compound of a heavy metal such as iron, cobalt or nickel. The resultant dithiodicarbonyl metal complex is recovered as the product obtained in the second step.

9 Claims, No Drawings

PROCESS FOR PREPARING DITHIODICARBONYL METAL COMPLEXES

BACKGROUND

Various dithiodicarbonyl metal complexes have heretofore been prepared and are described in the literature and patents, for example, by Schrauzer and Mayweg, Journal American Chemical Society, 87:7 4/5/65, pages 1,483–1,489, German Patent Publication 1,211,626 and German Patent Publication 2,144,801. These metal complexes have been indicated to be useful for reducing oxidative degradation in an organic material, particularly a polymeric material, as disclosed in British Patent 1,263,910. They are particularly useful in stabilizing polyolefins against ultraviolet radiation and especially polypropylene. In this respect they are thought to work not only as ultraviolet stabilizers but also as peroxide decomposers and free radical receptors.

Methods heretofore proposed for preparing these compounds have left much to be desired from the standpoint of yield. Various compounds of this type have heretofore been prepared by reacting an acyloin with a phosphorus sulfide followed by hydrolysis in the presence of a metal salt to give the metal complex but the reported yields are usually in the range of 30 to 40%.

OBJECTS

One of the objects of the present invention is to provide a process for preparing a dithiodicarbonyl metal complex in which increased yields are obtained.

Another object of the invention is to provide a new and improved process of the type described in which relatively inexpensive substances are employed to increase the yields without otherwise interfering with or complicating the practice of the process.

A more specific object is to provide a new and improved process for producing dithiodicarbonyl metal complexes of iron, nickel and cobalt. Other objects will appear hereinafter.

BRIEF SUMMARY OF THE INVENTION

In accordance with the invention dithiodicarbonyl metal complexes are prepared in increased yields by a two-step process in which an acyloin is reacted with a phosphorus sulfide in the presence of ammonium ion in a solvent in the first step and the reaction solution preferably after filtration to remove solid residues is reacted in a second step with an aqueous solution of a water soluble ionizable compound of a heavy metal such as iron, cobalt or nickel. The resultant dithiodicarbonyl metal complex is recovered as the product obtained in the second step.

DETAILED DESCRIPTION OF THE INVENTION

The invention is especially useful for the preparation of bis(dithiobenzil)nickel employing benzoin and phosphorus pentasulfide in the first step of the process together with a suitable organic solvent under anhydrous conditions. The resultant product bis(dithiobenzil)nickel is an excellent stabilizer for polyolefins, particularly polypropylene.

The aromatic ring of the benzoin can be substituted, for example, by methyl, chloro, and/or methoxy and the process is generally applicable to other acyloins (aliphatic and/or aromatic α-hydroxy ketones) and to other heavy metals such as iron, and cobalt.

While other phosphorus sulfides might be used, good results are obtained by using phosphorus pentasulfide ($P_2S_5$).

Of the suitable organic solvents which can be employed in this reaction the best results have been obtained with dioxane and it is the preferred solvent. A number of other solvents might also be used in this reaction although they might not be as efficient and/or desirable as the preferred solvent. Examples of such solvents, but not necessarily limited to these, might be xylene, the dimethylethers of ethylene and diethylene glycol, tetrahydrothiophene, sulfolane and carbon disulfide.

The critical point of the invention resides in the discovery that the yields can be increased by the addition of the ammonium ion in the first step of the reaction. The ammonium ion is preferably added as an ammonium salt and apparently its addition definitely increases the efficiency of the sulfur substitution in the reaction of the phosphorus sulfide and the acyloin.

It is believed that the presence of the ammonium ion acts as a catalyst but the exact mechanism involved is unknown.

A number of ammonium salts are effective. Among these tried were the chloride, bromide, sulfide, sulfamate, carbonate, thiosulfate, benzoate, bisulfate, and mono- and di-basic phosphate. Ammonium sulfate appears to be about the most efficient, and since it is readily available and inexpensive it is preferred. It has given yields from 64% to 0.1 eq. $NH_4^+$/mole of benzoin to 78% for 2 eq $NH_4^+$/mole benzoin. The "catalyst" must be added to the first step of the reaction. If added during the second step, no yield increase is seen. Ammonia also gives increased yields, but it is not as efficient as ammonium sulfate. Quaternary ammonium salts and amine salts are also effective in increasing the yield. Sodium sulfate does not give increased yields.

When the reaction is pushed by using the higher amounts of ammonium sulfate indicated above, crude yields as high as 90% are obtained. However, these materials show a high sulfur analysis, indicating contamination. Cleaning up this product by solvent extraction results in final yields of the order of 80%.

In general, it is preferable to use 0.8 to 1.0 eq $NH_4^+$/mole benzoin or 5 to 6 $(NH_4)_2SO_4$/20 g benzoin. It has been found that yields can vary somewhat. A number of factors could possibly affect the yield: variation in heating rate, reaction temperature and time, quality of solvent (e.g., moisture present), atmospheric moisture, quality of $P_2S_5$, dioxane-water ratio in the second step and quantity of solvent used in washing the product. However, yields in the range of 70% to 80% have been consistently obtained. Yields beyond 80% require very careful optimization of the reaction conditions and recovery of product from the process solvent.

The effect of time on the reaction is shown in the table below:

| Reaction Time | First Step (Sulfur Substitution) (Hours) | Second Step (Hydrolysis) | |
|---|---|---|---|
| | | (1 Hr.) | (2 Hrs.) |
| Catalyzed System | 1 | 57% | 58% |
| 0.8 eq. $(NH_4)^+$/mole benzoin | 2 | 64% | 66% |
| | 4 | 69% | 73% |
| | 19 | — | 68% |
| Uncatalyzed | 4 | 48% | 49% |
| | 19 | — | 65% |
| | 2 | — | 31% |

While the optimum $P_2S_5$/benzoin mole ratio has not been determined, a 2:1 ratio gives better yields than a 1:1 ratio and increasing beyond 2:1 does not give increased yields. In all the reactions in which no ammonium ion is present, excess $P_2S_5$ recovered from the reaction by filtration at the end of the first step had the appearance of the starting $P_2S_5$. However, in all the reactions catalyzed by ammonium sulfate, this "excess $P_2S_5$" is white (instead of yellow), deliquescent, not completely water soluble and gives an acid reaction to water. The exact composition of this material is unknown except that it does not analyze for $P_2S_5$. Since this material is not completely water soluble, an intermediate filtration is desirable.

The dithiodicarbonyl metal complexes are only slightly soluble in organic solvents such as dioxane, dichloromethane or xylene and in recovering the product it has been found that a simple washing of the filter cake with dioxane removes reaction by-products well enough to give a product with good elemental analysis and ultraviolet spectra. The product can also be washed with water to remove any soluble nickel salts and with alcohol to hasten drying.

The temperatures used in carrying out the reactions are those conventionally employed for reactions of this type and usually where dioxane is used as a solvent, the reaction is carried out at the reflux temperature of about 100°C. for the first step and about 88°C. for the second step. The boiling point of dioxane is about 100°C. and the boiling point of the dioxane-water azeotrope is about 88°C.

The ammonium group is apparently the effective catalyst regardless of whether it is derived from ammonia, ammonium compounds and/or amine compounds and regardless of whether the nitrogen atom is linked to 1, 2, 3 or 4 hydrogen atoms or to no hydrogen atoms, as in a quaternary nitrogen compound.

The invention is further illustrated by the following examples in which the quantities are stated in parts by weight unless otherwise indicated.

EXAMPLE I

Step 1:

To a 500 ml. round-bottom flask equipped with stirrer, condenser and thermometer, was added in order, 20 g (0.094 mole) benzoin, 150–170 ml. dioxane, 40g phosphorous pentasulfide and 6.2g (0.047 mole, 1.0 eq $NH_4^+$/mole benzoin) ammonium sulfate. The mixture was refluxed with stirring for 2 hours. After cooling, the mixture was filtered and the filter cake was washed with dioxane (30–60 ml).

Step 2:

The filtrate from Step 1 was transferred to a 1 liter flask equipped as above and 12g (0.05 mole) nickel chloride hexahydrate in 70 ml. water was added. The mixture was stirred and refluxed for 2 hours. After cooling, product was collected by filtration, the filter cake was washed with dioxane (20–30 ml) then water and finally alcohol. After vacuum drying there was obtained 17.7g (69% yield) of bis(dithiobenzil)nickel.

EXAMPLE II

The procedure was the same as in Example I, except only 5g ammonium sulfate (0.8 eq $NH_4^+$/mole benzoin) was used and the reflux times were changed as indicated in the table below. Also included for comparison are results when no ammonium sulfate was used in Step 1.

| Reaction Time | Step 1 (Hours) | Step 2 1 Hr. | Step 2 2 Hrs. |
|---|---|---|---|
| Catalyzed System (0.8 eq $NH_4^+$/mole benzoin as $(NH_4)_2SO_4$) | 1 | 57 | 58 |
| | 2 | 64 | 66 |
| | 4 | 69 | 73 |
| | 19 | — | 68 |
| Uncatalyzed Reaction (no $(NH_4)_2SO_4$) | 2 | — | 31 |
| | 4 | 48 | 49 |
| | 19 | — | 65 |

EXAMPLE III

The procedure was the same as for example I except only 0.6g ammonium sulfate (0.1 eq $NH_4^+$/mole benzoin) was used to give 16.5g (64.5%) bis(dithiobenzil)nickel.

EXAMPLE IV

The procedure was the same as for Example I except 12.4g ammonium sulfate (2.0 eq $NH_4^+$/mole benzoin) was used to give 19.9g or 78% yield of bis(dithiobenzil)nickel.

EXAMPLE V

The procedure was the same as for Example I except 10.8g ammonium bisulfate (0.094 mole, 1 eq. $NH_4^+$/mole benzoin) was used to give 18.2g or 71% of bis(dithiobenzil)nickel.

EXAMPLE VI

The procedure was the same as for Example I except that 8.6g ammonium sulfamate (0.075 mole, 0.8 eq $NH_4^+$/mole benzoin) was used to give 18.2g or 71% of bis(dithiobenzil)nickel.

EXAMPLE VII

The procedure was the same as for Example I except that 0.26 g ammonia was added as a solution in dioxane (0.015 moles, 0.16 eq $NH_4^+$/mole benzoin) to give 15.7g or 61% of bis(dithiobenzil)nickel.

EXAMPLE VIII

The procedure was the same as for Example I except that 5.6g ammonium thiosulfate (0.038 mole, 0.8 eq $NH_4^+$/mole benzoin) was used to give 17.2g or 67% of bis(dithiobenzil)nickel.

EXAMPLE IX

The procedure was the same as for Example I except that 7.3g trimethylamine hydrochloride (0.076 mole, 0.8 eq R$_3$NH$^+$/mole benzoin) was used to give 14.6g or 57% of bis(dithiobenzil)nickel.

EXAMPLE X

The procedure was the same as for Example I except that 15.8g tetraethylammonium bromide (0.075 mole, 0.8 eq R$_4$N$^+$/mole benzoin) was used to give 16.2g or 63% of bis(dithiobenzil)nickel.

EXAMPLE XI

The procedure was the same as for Example I except that 25.6g (0.094 mole) anisoin was used in place of benzoin to give 18.7g (60%) yield of bis(dithio-4,4'-dimethoxybenzil)nickel.

EXAMPLE XII

The procedure was the same as for Example I except that 12g cobaltous chloride hexahydrate was used in place of nickel chloride to give 19.2g (75%) yield of bis(dithiobenzil) cobalt.

EXAMPLE XIII

The procedure was the same as for Example I except that 14g ferrous sulfate heptahydrate was used to give 9.5g (37%) yield of bis(dithiobenzil)iron.

It will be recognized that various modifications can be made without departing from the invention. In the foregoing examples the reactions were carried out at atmospheric pressure. Water should be avoided in the first step because it reacts with the phosphorus sulfide, and consumes this reactant.

Hydrogen sulfide is evolved in both steps of the reactions and care should be taken to properly vent or otherwise eliminate it as, for example, by trapping this gas as it is evolved in caustic soda.

An important advantage of the invention is the reduction in time of the catalyzed reactions to around 1 to 4 hours versus 20 to 40 hours for the uncatalyzed reactions by prior art methods.

The invention in hereby claimed as follows:

1. A process for preparing a dithiodicarbonyl metal complex which comprises:
    a. reacting an acyloin with a phosphorus sulfide in the presence of ammonium ion in a solvent and
    b. reacting the reaction solution from (a) with an aqueous solution of a reactive water soluble ionizable compound of a heavy metal to form a dithiodicarbonyl metal complex, the quantity of said ammonium ion corresponding to 0.1 to 2.0 (NH$_4$)$^+$ equivalents per mole of said acyloin, and said acyloin being selected from the group consisting of benzoin and substituted benzoins in which the substituents are from the group consisting of methyl, chloro- and methoxy, said ammonium ion being derived from substances from the group consisting of ammonia, and water soluble ammonium, amine and quaternary salts, and said heavy metal being selected from the group consisting of iron, cobalt and nickel.

2. A process as claimed in claim 1 in which said acyloin is benzoin.

3. A process as claimed in claim 1 in which said solvent is dioxane.

4. A process as claimed in claim 1 in which said ammonium ion is 0.8 to 1.0 (NH$_4$)$^+$ equivalents per mole of said acyloin.

5. A process as claimed in claim 1 in which said ammonium ion is added as ammonium sulfate.

6. A process as claimed in claim 1 in which said phosphorus sulfide is P$_2$S$_5$.

7. A process as claimed in claim 1 in which said phosphorus sulfide is P$_2$S$_5$ and the molar ratio of P$_2$S$_5$ to acyloin is approximately 2:1.

8. A process as claimed in claim 1 in which said heavy metal is nickel and the acyloin is benzoin.

9. A process as claimed in claim 1 in which the reaction solution from step (a) is filtered and the solid residue removed prior to step (b).

* * * * *